May 21, 1940.   A. JACKSON ET AL   2,201,179
AUTOMOBILE LIFT
Filed Nov. 26, 1938   3 Sheets-Sheet 1
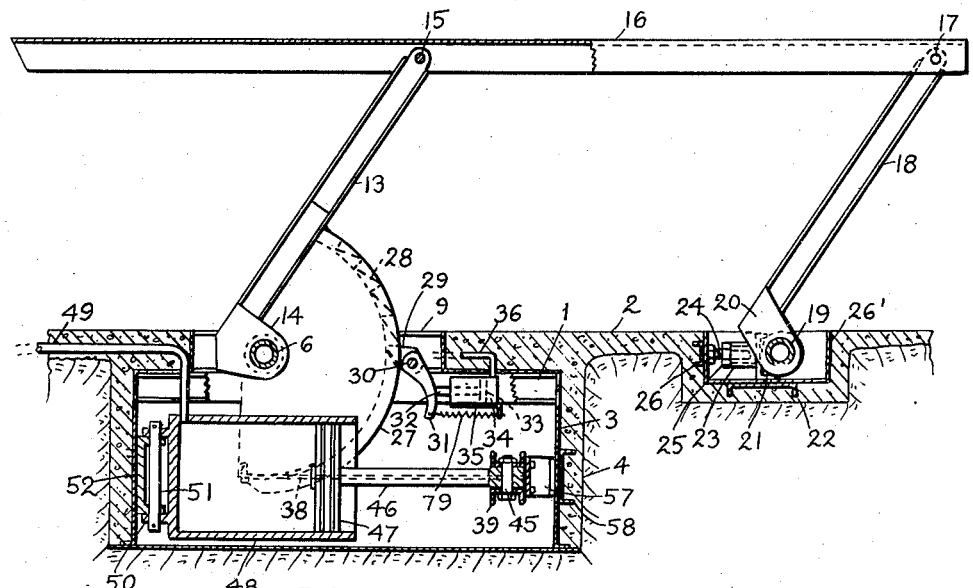
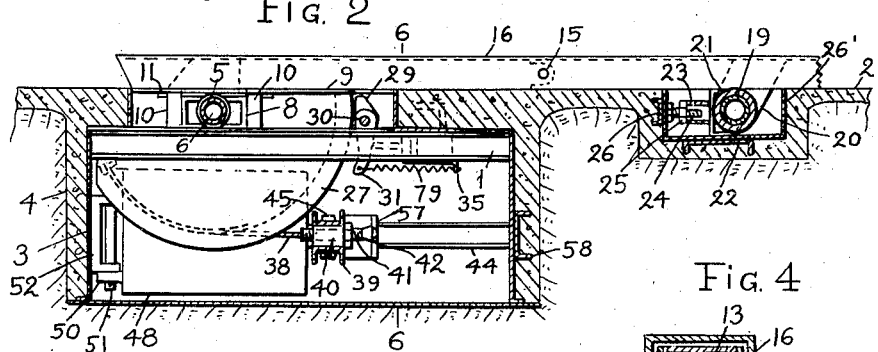
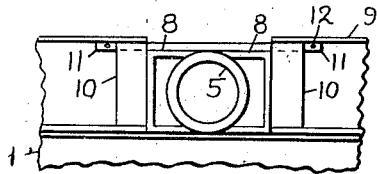
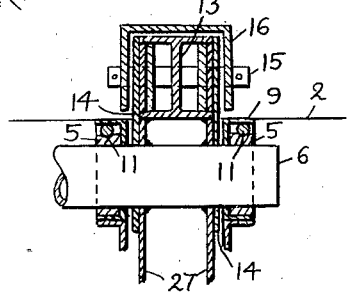
VADIM S. MAKAROFF
ALEXIS JACKSON
INVENTOR.
BY John P. M Ronor
ATTORNEY.

May 21, 1940.　　A. JACKSON ET AL　　2,201,179
AUTOMOBILE LIFT
Filed Nov. 26, 1938　　3 Sheets-Sheet 2
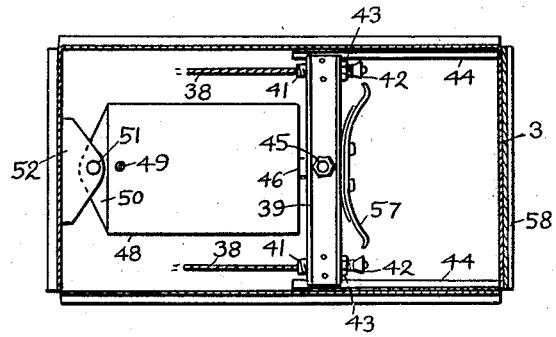
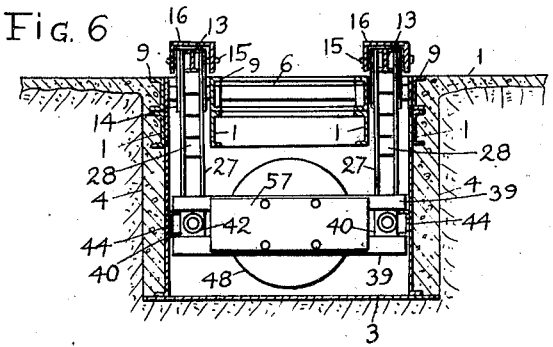
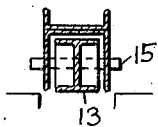
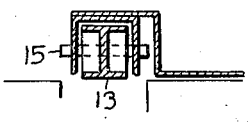
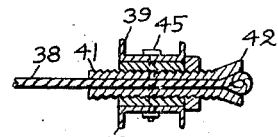
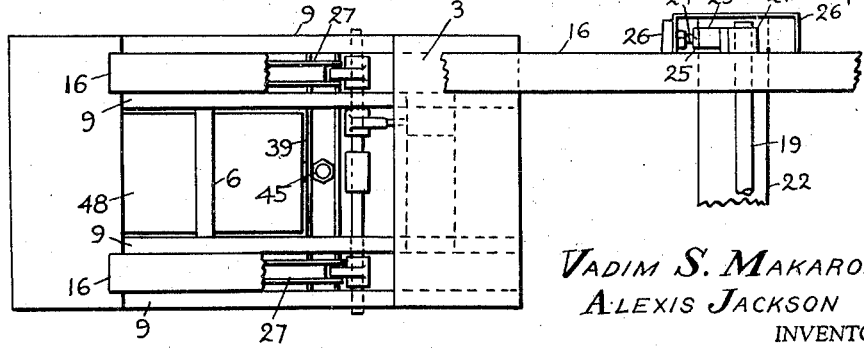
VADIM S. MAKAROFF
ALEXIS JACKSON
INVENTOR.
BY　John P. Rixonow
ATTORNEY.

May 21, 1940.　　　A. JACKSON ET AL　　　2,201,179
AUTOMOBILE LIFT
Filed Nov. 26, 1938　　　3 Sheets-Sheet 3
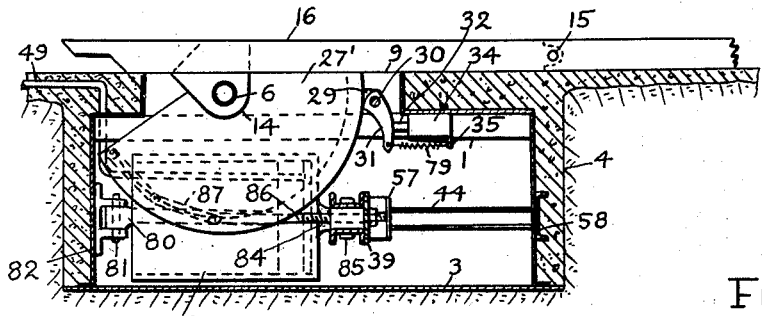
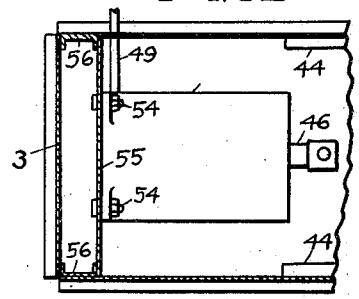
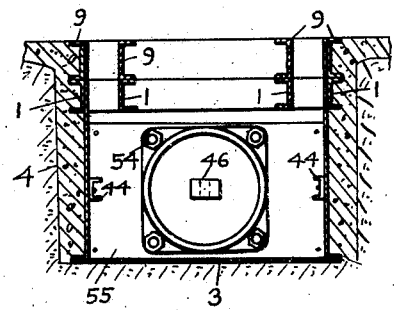
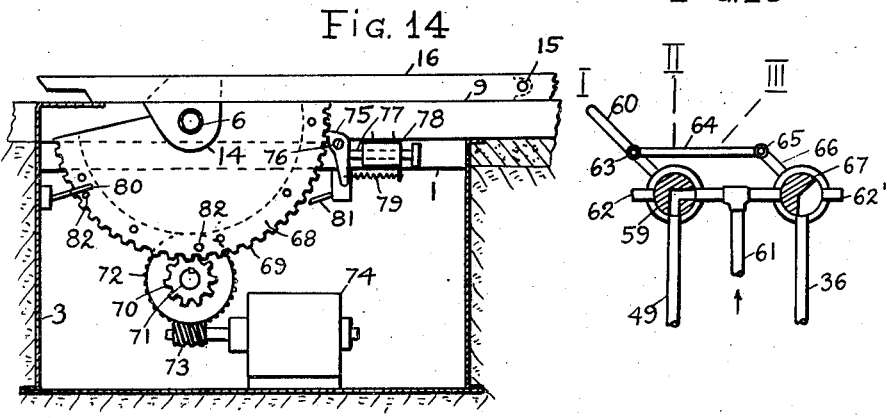
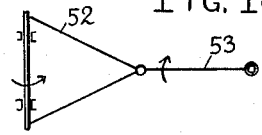
VADIM S. MAKAROFF
ALEXIS JACKSON
INVENTOR.
BY　*John P. Nixonov*
ATTORNEY.

Patented May 21, 1940

2,201,179

UNITED STATES PATENT OFFICE 2,201,179

AUTOMOBILE LIFT

Alexis Jackson, Astoria, and Vadim S. Makaroff, New York, N. Y.; said Jackson assignor to said Makaroff Application November 26, 1938, Serial No. 242,476

17 Claims. (Cl. 254—91)

Our invention relates to automobile lifts and has particular reference to lifts for raising automotive vehicles.

Our invention has for its object to provide an automobile lift, which can be used for raising automotive vehicles in horizontal position on a pair of parallel rails. The rails for this purpose are pivotally mounted on parallel arms rotatively supported on a frame and operatively connected with a motor.

In ordinary lifts of this type, the vehicle is so placed that its weight is distributed over the front and rear arms. It is therefore necessary to provide an additional motor for the front arms, or, if a single motor is used for the rear arms only, this motor must be of an unduly large capacity to enable it to lift the front end of the vehicle through the parallelogram connections between the front and rear arms under the worst conditions, at the beginning of the lift when the lifting angle and moment of the force are very small. In order to overcome this disadvantage of ordinary lifts, we arrange the rails in such manner that the greatest part of the vehicle weight is always placed over the rear arms, the front arms being thereby largely relieved of the load. A relatively smaller motor can be therefore used since it always operates under the most favorable conditions. We accomplish this purpose by connecting the upper ends of the rear arms to the middle portions of the rails, the front arms being connected to the front ends of the rails, so that the vehicle is always placed over the rear arm.

Another object of our invention is to provide a box-like subframe under the beams supporting the rear arms, the subframe enclosing a motor and mechanism connecting the motor with the arms for their rotation.

The box-like subframe represents an important advantage in that it enables all the operating parts of the mechanism to be assembled and lined up prior to the installation of the lift. The installation is thereby greatly simplified, it being only necessary to dig a hole for the subframe and to make a foundation for the beam on which the auxiliary arms are mounted, the space in the hole around the subframe being then filled with concrete. This arrangement has an added advantage in that all parts of the mechanism are concealed under the base of the lift, nothing being exposed above the floor of the shop but the arms and rails.

Another object of our invention is to provide operative connections between the motor and the arms whereby the torque applied to the arms remains constant. This is accomplished in our automobile lift by the provision of sectors attached to the arms and concentric with their axes of rotation, the force of the motor being applied to the periphery of the sectors in tangential direction.

Another object of our invention is to transmit the power from the motor directly to the arms so that the shaft connecting the arms is relieved from the driving torque and may be therefore made considerably lighter than in ordinary constructions in which the torque is transmitted through the shaft. By providing rigid connection between the arms by means of the common supporting shaft and the sectors, we obtain a rigid system in which the arms are raised uniformly regardless of any unequalities in the distribution of load which may occur in practice, so that the load is always laterally balanced.

Another object of our invention is to provide a locking mechanism which will automatically retain the arms in the raised position even if the lifting motor is disengaged. For this purpose we provide the sector on its periphery with teeth engaged by a pawl or dog under action of a spring.

Another object of our invention is to provide means to automatically release the locking device when the motor is deenergized for allowing the arms to be lowered by the weight of the vehicle, or when the motor is reversed for lowering the arms if the operative mechanism is of the irreversible type, as, for instance, if a worm gear is employed. In our arrangement the locking device is rendered operative when the motor is energized for lifting the vehicle and when the motor control is in the neutral position as, for instance, when the vehicle must be left in the raised position.

Another object of our invention is to provide a lifting motor in the form of an air cylinder with a piston operatively connected to the arm sectors, the cylinder being yieldably or hingedly mounted in the subframe so that it can adjust itself to equalize any disalignment of the operating parts. The piston is connected to a horizontal cross beam guided at its ends in the subframe, the cylinder having preferably a vertical axis of rotation so that the whole system, while being self-adjusting, remains nevertheless sufficiently rigid for transmitting the power to the sectors.

Still another object of our invention is to provide an individual adjustment for the front arm bearing in the foundation. This arrangement facilitates the installation in view of the fact that short foundation beams are used which do not extend through the full length of the lift, and it also makes it possible to check and correct the alignment of the arms from time to time.

Our invention in its preferred embodiments is more fully described in the accompanying specification and drawings in which—

Fig. 1 is a sectional elevational view of the lift in the raised position.

Fig. 2 is a similar view of the lift in the lowered position.

Fig. 3 is a detail view of the rear bearing.

Fig. 4 is a sectional detail view of the rear bearing, showing also the rail and arm in section.

Fig. 5 is a sectional top plan view of the operating cylinder.

Fig. 6 is a section taken on the line 6—6 of Fig. 2.

Fig. 7 is a sectional detail view of a modified rail for lifting a vehicle by its wheels.

Fig. 8 is a similar view of another modification.

Fig. 9 is a detail view of the attachment of operating cables.

Fig. 10 is a fractional top plan view showing the locking mechanism.

Fig. 11 is a sectional elevational view of a modified lift.

Fig. 12 is a detail view of a modified cylinder mounting.

Fig. 13 is an end view of the same.

Fig. 14 is a sectional elevational view of an electrically operated lift.

Fig. 15 is a diagrammatic view of the control valve arrangement.

Fig. 16 is a diagrammatic view of the cylinder and piston with its cross beam.

Our auto lift comprises short foundation beams 1 supported under a floor 2 of a shop, the sides of a box-like subframe 3 made of sheet metal and set into an excavation, the subframe being also used as a form for pouring concrete 4 around it, thereby facilitating the installation of the mechanism. The beams support bearings for a tubular shaft 6. The bearings represent bushings 5 to which short pieces of channel iron 8 are attached as by welding, thereby forming boxes placed on the top surface of the beams 1 between supplementary beams 9 which abut the bearing boxes as shown in Fig. 3.

The ends of the beams 9 have blocks 10 supporting pins 11 held in place by cotter pins 12 and retaining the bearing boxes. This arrangement has an advantage of simplicity since no bolts are required for holding the bearings in place.

The shaft 6 is rigidly connected with arms 13 by means of plates 14 welded to the shaft. The upper ends of the arms are pivotally connected at 15 to rails 16 of a channel shape so that the ends of the arms are concealed under the rails. The plates 14 are offset so that the arms lie horizontally inside the rails when they are lowered as shown in Fig. 2. This arrangement facilitates turning the arms from their lowermost position, the axis of rotation being substantially below the axis of the pivots 15. The pivot 15 is placed near the middle point of the rails 16, the front ends of the rails being pivotally connected at 17 to the upper ends of front arms 18 mounted on a tubular shaft 19 by means of offset plates 20. The shaft 19 is journaled in bearings 21 slidably supported on a cross beam 22. The bearings 21 have tubular extensions 23 in the rear for bolts 24 with nuts 25, the heads of the bolts resting against beams 26 imbedded in concrete in boxes 26'. The bearings may be shifted on the beam 22 by turning the nuts 25. With the arrangement of the pivoting points as shown, the vehicle is always so placed on the rails that its weight is almost wholly supported by the rear arms thereby relieving the front arms from any considerable portion of the strain. It is possible therefore to apply the lifting power to the rear arms only thereby also reducing the maximum torque required for the motor in order to lift the front arms under the worst operating conditions when the arms lie flat. The sectors abut the arms, supporting their lower portions.

The rear arms are provided with lifting sectors 27 with ratchet teeth 28 on the periphery engaged by dogs or pawls 29 mounted on a shaft 30. An arm 31 is rigidly mounted on the shaft 30 and is engaged by a rod 32 connected with a piston 33 in an auxiliary cylinder 34 mounted on a cross bar 35 attached to the beams 1. Compressed air is admitted to the cylinder through a pipe 36. A spring 79 turns the pawls against the ratchet teeth 28.

The sectors have grooves 37 for cables 38 or similar flexible members attached to the sectors at the end and extending to the cross bar 39. The latter is formed of two channel irons with blocks 40 bolted between them, the blocks having holes for hollow threaded studs 41 (Fig. 9) with diverging or funnel-shaped ends 42. The cables pass through the holes in the studs and have knots on the ends fitting in the end funnels 42. Nuts 43 are provided for adjusting the length of the cables and for equalizing the pull on both sectors. The ends of the bar 39 slide in guiding channel irons 44 attached to the walls of the subframe 3. A stud shaft 45 is fitted in the middle of the bar 39 for the end of a piston rod 46 of a piston 47 sliding in a cylinder 48. A pipe 49 is fitted into the bottom portion of the cylinder and is used for admitting compressed air into the cylinder. The latter is hingedly supported by means of lugs 50 with holes for a shaft 51 fitted in a bracket 52 attached to the wall of the subframe box 3. The cylinder can move in a horizontal direction on its pivoting shaft 51 and is therefore self-aligning with respect of the piston 47 which is of sufficient length to guide the cylinder. It may be noted that while the cylinder can rotate in a horizontal plane, the cross bar 39 with the piston has a limited degree of rotary movement in the vertical plane, the ends of the bar 39 fitting with some clearance in the guiding channels 44.

The whole system therefore, while being sufficiently flexible for its self-alignment, tends to retain its alignment, being equivalent to two triangles 52 and 53, Fig. 16, pivotally joined at their apices and having their bases supported on pivots at right angles to each other. The piston may be connected rigidly with the cross bar 39 by tightening the stud shaft 45 or replacing it with a bolt or bolts. The degree of movement of the cylinder may be also reduced by mounting its base by bolts 54 (Fig. 12) in a flexible plate 55 mounted on channel irons 56 at the sides of the subframe 3.

The sectors 27 provide convenient lifting arrangement with constant leverage for the motor represented in this case by the air cylinder 48 so that a constant torque is applied to the lifting arms by the motor. This is especially important during the first stages of the lifting operation when the moment of resistance of the arms is greatest. At the end of the lift the moment of resistance is considerably reduced, and in order to prevent a too rapid movement of the piston, the cross bar 39 has buffer springs 57 which engage the opposite wall of the subframe box 3 at the end of the piston movement. A channel bar 58 reinforces the wall at that point. The piston is shown fully expanded in Fig. 1, the springs 57 pressing against the bar 58, the arms being lifted to the full height. The lowered position is shown in Fig. 11 in which the cables are replaced by chain links 87 and a threaded stud 86.

A valve 59 (Fig. 15) is provided for admitting compresed air into the cylinder 48. The handle 60 has three positions: position I, in which the cylinder is connected with the pipe 61 extending to a source of compressed air (not shown); position II, or neutral, in which the cylinder is disconnected from the pipe 61 and holds the compressed air, and position III, in which the air from the cylinder is exhausted through a vent 62. The handle 60 is pivoted at 63 to a link 64 whose other end is pivoted at 65 to a handle 66 of a valve 67 admitting compressed air into the auxiliary cylinder 34 through the pipe 36. The valve is made so that it exhausts the air from cylinder 34 through a vent 62' when the handle 60 is in position I and II, and admits compressed air into the cylinder 34 when the handle is in position III, thereby releasing the locking pawls 29 from the teeth 28 of the sectors 27. It is immaterial, of course, to which valve the handle 60 is attached.

This arrangement of the valves enables the pawls to hold the arms locked in the raised position when the main cylinder 48 is energized and also when it is left with the compressed air in the raised position (handle 60 in the neutral position II); the pawls become immediately released, however, when the handle 60 is placed in position III for lowering the arms by releasing air from the cylinder 48.

A modified construction is shown in Fig. 14, the sectors 68 in this case being provided with gear teeth 69 in mesh with pinions 70 on a shaft 71 journaled in the end plates of the subframe 3. The shaft 71 has also a worm gear 72 in mesh with a worm 73 on the end of the shaft of an electric motor 74.

The worm gear drive may be made self-locking so that it is not necessary to have any additional locking devices for the segments. As a precautionary measure, however, an automatic dog 75 may be provided with teeth engaging the segment teeth. The dog is pivoted at 76 and is engaged by a plunger 77 of a magnetic solenoid 78. A retrieving spring 79 causes the dog to engage the segment. The magnet, when energized, moves the dog away from the segment. The electrical connections are so made that the magnet is deenergized when the motor control switch is in the neutral position or is set for the lifting operation, and is energized for the lowering operation.

The control switches are of a simple construction and may be of an ordinary type not shown on the drawings. Automatic stop switches 80 and 81 may be provided for limiting the movements of the sectors, the latter having lugs 82 for tripping the switches.

Another modification is shown in Fig. 11, the piston rod 80' being pivotally connected at 81' to a bracket 82' mounted on the wall of the subframe 3. The cylinder 83 slides over the piston, the pipe 49 being fitted in the piston as shown in dotted lines. The cylinder has a lug 84 attached to the cross-bar 79 by a bolt 85. The bar 39 has threaded studs 86 connected by chain links 87 with the sectors 27'. In its operation this mechanism is similar to the mechanism shown in Fig. 1.

It is understood that our lift may be further modified without departing from the spirit of our invention as set forth in the appended claims.

Our lift has the following important advantages:

1. The load of a vehicle is longitudinally balanced on the rails, its major portion being supported by the rear or power arms. For all vehicles having wheel base within ordinary limits, their center of gravity must always be placed over the power arms because of the arrangement of the rails and their supports as described. Relatively short vehicles may be, of course, somewhat displaced from the normal central position, but the effect of such displacement is insignificant due to the relatively light weight of short automobiles. The rails are so proportioned that the larger vehicles must be necessarily placed in the corect position. The front arms are therefore largely relieved from the compression strain, which may be even reversed and replaced with tension strain when, for instance, the center of gravity of the vehicle is placed behind the pivoting point of the rear arms.

It is therefore possible to make the front or auxiliary arms of a considerably lighter construction than it would be necessary in a lift in which the position of the load may vary in relation to the pivoting points of the arms.

2. The load is also balanced laterally. Any uneven distribution of the load on the rails is compensated by the rigid connection between the two power arms and between the two auxiliary arms. This is accomplished without providing any connections between the left and right arms above the floor so that the space between the arms and between the rails is clear for work on the under side of the vehicle on the rails.

3. The arms rest on the upper portions of the driving sectors thereby relieving the lower portions of the arms from the excessive strain. The driving torque is applied to both sectors so that the connecting shaft need not be designed to carry the full driving torque of the motor. It is evident that the only torque to which this shaft may be subjected is the relatively small unbalanced torque between the two sectors as may be caused by an uneven distribution of the load on the rails.

4. Due to the concentration of the load on the rear or power arms, it is not necessary to have long beams in the base extending between the front and rear arms, so that a short subframe with short beams suffices for the rear arms, the front arms having separate bearings with an independent adjustment. With this arrangement the construction becomes lighter and less expensive than in ordinary lifts having long foundation beams.

5. The box-like subframe has all the mountings for the power plant, the whole mechanism being self-contained, no major adjustments or realignment being necessary for the lift during its installation.

6. The motor is mounted on a yieldable support and is therefore self-aligning. The beam 39 also provides for a balanced distribution of force to both sectors. Tangential application of force to the sectors assures of a constant torque application to the arms.

7. The channel-shaped rails completely cover the pivoting points of the arms and protect them from being damaged during operation of the lift.

It should be noted that the sector 27 or 27' may not have the geometrically arcuate periphery, and it may be trimmed in an annular shape, as, for instance, is shown in the lower part of the sector 27', were this engaged by the chain links.

We claim as our invention:

1. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors rigidly mounted on the rear arms concentrically with the axes of rotation of the arms, a motor, means to rotate the sectors by the motor, ratchet teeth on the periphery of the sectors, pawls yieldably engaging the teeth, and adapted to prevent the downward rotation of the arms, and means to release the pawls from the ratchet teeth when the motor is rendered operative for the downward movement of the arms.

2. An automobile lift comprising a pair of rear arms, a shaft rigidly connecting the lower ends of the arms, means to rotatively support the shaft, a pair of front arms, means to rotatively support the lower ends of the front arms, a pair of rails pivotally supported on the upper end of the respective front and rear arms and adapted to support an automotive vehicle, the rails and the arms with their supporting means forming two hinged parallelograms, means to rotate the rear arms, and means to individually adjust the horizontal position of the rotative support of the front arms.

3. An automobile lift comprising a pair of rear arms, a shaft rigidly connecting the lower ends of the arms, means to rotatively support the shaft, a pair of front arms, means to rotatively support the lower ends of the front arms, a pair of rails pivotally supported on the upper end of the respective front and rear arms and adapted to support an automotive vehicle, the rails and the arms with their supporting means forming two hinged parallelograms, means to rotate the rear arms, boxes for the lower ends of the front arms, bearings slidably supported in the boxes, and means to adjust the horizontal position of the bearings in the boxes.

4. An automobile lift comprising a pair of rear arms, a shaft rigidly connecting the lower ends of the arms, bearings for the shaft beams supporting the bearings, blocks mounted on the beam at the front and at the rear of the bearings, pins engaging the blocks and retaining the bearings in position, a pair of front arms, means to rotatively support the lower ends of the front arms, a pair of rails pivotally supported on the upper end of the respective front and rear arms and adapted to support an automotive vehicle, the rails and the arms with their supporting means forming two hinged parallelograms, means to rotate the rear arms, and means to individually adjust the horizontal position of the rotative support of the front arms.

5. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors rigidly mounted on the arms concentrically with the axes of rotation of the arms, a cylinder, a piston in the cylinder, means to admit compressed fluid into the cylinder thereby producing relative movement between the piston and the cylinder, and means to utilize said relative movement for rotating the sectors with the arms.

6. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors rigidly mounted on the arms concentrically with the axes of rotation of the arms, a cylinder, a piston in the cylinder, means to admit compressed fluid into the cylinder, thereby producing relative movement between the piston and the cylinder, means to utilize said relative movement for rotating the sectors with the arms, and a yieldable means to retard said relative movement at the end of the lifting operation.

7. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors mounted on the lower portion of the arms extending below their axes of rotation concentrically therewith, a cylinder yieldably supported under the sectors, a piston movably fitted in the cylinder, means to admit compressed fluid into the cylinder for moving the piston, and means to rotate the sectors by the piston.

8. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors mounted on the lower portion of the arms extending below their axes of rotation concentrically therewith, a cylinder yieldably supported under the sectors adapted to adjustably move in a horizontal plane, a piston movably fitted in the cylinder, a cross bar horizontally connected with the piston outside the cylinder, operative connections between the bar and the sectors, means to guide the ends of the bar.

9. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors mounted on the lower portion of the arms extending below their axes of rotation concentrically therewith, a cylinder yieldably supported under the sectors adapted to adjustably move in a horizontal plane, a piston movably fitted in the cylinder, a cross bar horizontally connected with the piston outside the cylinder, operative connections between the bar and the sectors, means to guide the ends of the bar, the bar with the piston forming a system adjustably rotating on a horizontal axis, the cylinder forming a system adjustably rotating on a vertical axis, the two systems thereby forming a combined self-aligning system.

10. An automobile lift comprising a pair of front arms, a pair of rear arms, means to rotatively support the arms, all of said arms being in parallel relation to each other, a pair of rails pivotally supported on the upper ends of the respective front and rear arms and adapted to support an automotive vehicle, the rails and the arms with their supporting means forming two hinged parallelograms, sectors mounted on the lower portion of the arms extending below their axes of rotation concentrically therewith, a cylinder yieldably supported under the sectors adapted to adjustably move in a horizontal plane, a piston movably fitted in the cylinder, a cross bar horizontally connected with the piston outside the cylinder, operative connections between the bar and the sectors, means to guide the ends of the bar, flexible members connecting the ends of the bar with the peripheral portions of the sectors, means to guide the bar.

11. An automobile lift comprising a base, arms rotatively supported on the base at their lower ends, rails pivotally supported at the upper ends of the arms forming hinged parallelograms with the base, a fluid operated motor comprising a cylinder and a piston operatively connected with one pair of arms, means to admit compressed fluid into the cylinder for raising the arms, means to prevent the downward movement of the arms, a fluid operated motor adapted to render the downward movement preventing means inoperative, and means to release the fluid from the cylinder by admitting fluid into the motor.

12. An automobile lift comprising a base, arms rotatively supported on the base at their lower ends, rails pivotally supported at the upper ends of the arms forming hinged parallelograms with the base, a fluid operated motor in the base operatively connected with the arms, means to admit compressed fluid into the motor for raising the arms, means to release the fluid from the motor for lowering the arms, means to lock the arms in the raised position, an auxiliary fluid operated motor for releasing the locking means from the arms, and means to admit the fluid into the auxiliary motor only when the fluid is released from the lifting motor.

13. An automobile lift comprising a base, arms rotatively supported on the base at their lower ends, rails pivotally supported at the upper ends of the arms forming hinged parallelograms with the base, a fluid operated motor operatively connected with the arms, a valve arrangement comprising means to admit compressed fluid into the motor for raising the arms, means to lock the arms in the raised position, means to exhaust the fluid from the motor for lowering the arms, an auxiliary fluid operated motor for releasing the locking means from the arms, and means in the valve arrangement for admitting fluid into the auxiliary motor when the fluid is being exhausted from the lifting motor.

14. An automobile lift comprising a base, arms rotatively supported on the base at their lower ends, rails pivotally supported at the upper ends of the arms forming hinged parallelograms with the base, a motor, means to operate the arms by the motor, means to lock the arms in the raised position, an auxiliary motor adapted to release the locking means for the arms, and means to energize the auxiliary motor by deenergizing the lifting motor for raising the arms.

15. An automobile lift comprising a base, arms rotatively supported on the base at their lower ends, rails pivotally supported at the upper ends of the arms forming hinged parallelograms with the base, a fluid operated motor operatively connected with the arms for their raising when energized, a manually operable valve adapted in one position to admit compressed fluid into the motor, to lock the fluid in the second position, and to exhaust the fluid in the third position, means to lock the arms in the raised position, an auxiliary fluid operated motor adapted to render the locking means inoperative, a valve forming a unit with the first valve and adapted to admit the fluid into the auxiliary motor when the first valve is placed in the third position, and adapted to exhaust the fluid from the auxiliary motor when the first valve is placed in one of the first two positions.

16. An automobile lift comprising two pairs of arms, the lower ends of each pair of the arms being rigidly connected by a shaft, means to rotatively support the shafts, two rails, each rail being pivotally supported on one front and one rear arm, the arms being aligned in a parallel relation to each other, the rails and the arms being adapted to support an automobile, means applied individually to each of the rear arms for raising the rails, each shaft forming with its two opposite arms a rigid U-shaped structure, the shaft representing a sole connection between the opposite arms, a free passage being thereby provided between the rails and the arms when the rails are raised.

17. An automobile lift comprising two pairs of arms, the lower ends of each pair of the arms being rigidly connected by a shaft, means to rotatively support the shafts, two rails, each rail being pivotally supported on one front and one rear arm, the arms being aligned in a parallel relation to each other, the rails and the arms being adapted to support an automobile, means applied individually to each of the rear arms for raising the rails, each shaft forming with its two opposite arms a rigid U-shaped structure, the shaft representing a sole connection between the opposite arms, a free passage being thereby provided between the rails and the arms when the rails are raised, the rails being of a length corresponding to the length of an automobile, the rear arms being pivoted approximately at the middle portions of the rails, being thereby adapted to support the major portion of the weight of the automobile.

VADIM S. MAKAROFF.
ALEXIS JACKSON.